US011126388B2

(12) United States Patent
Ding

(10) Patent No.: US 11,126,388 B2
(45) Date of Patent: Sep. 21, 2021

(54) MEASUREMENT INSTRUMENT IDENTIFICATION SYSTEM AS WELL AS METHOD FOR FINDING A PARTICULAR MEASUREMENT INSTRUMENT

(71) Applicant: Rohde & Schwarz GmbH & Co. KG, Munich (DE)

(72) Inventor: Chow Han Ding, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 16/283,423

(22) Filed: Feb. 22, 2019

(65) Prior Publication Data

US 2019/0265933 A1 Aug. 29, 2019

(30) Foreign Application Priority Data

Feb. 23, 2018 (EP) .................... 18158323

(51) Int. Cl.
*G06F 3/14* (2006.01)
*G01C 25/00* (2006.01)
*G06F 3/0346* (2013.01)
*G02B 27/01* (2006.01)
*G06F 3/01* (2006.01)

(52) U.S. Cl.
CPC .............. *G06F 3/14* (2013.01); *G01C 25/00* (2013.01); *G02B 27/017* (2013.01); *G06F 3/012* (2013.01); *G06F 3/0346* (2013.01); *G02B 2027/0141* (2013.01); *G02B 2027/0187* (2013.01)

(58) Field of Classification Search
None
See application file for complete search history.

(56) References Cited

U.S. PATENT DOCUMENTS

| 9,547,939 | B2 | 1/2017 | Hittel et al. |
| 2014/0055488 | A1 | 2/2014 | Masters |
| 2014/0085309 | A1* | 3/2014 | Czapar ............. G06F 3/147 345/441 |
| 2014/0198017 | A1 | 7/2014 | Lamb et al. |
| 2016/0005233 | A1 | 1/2016 | Fraccaroli et al. |
| 2016/0260261 | A1 | 9/2016 | Hsu |
| 2020/0049826 | A1* | 2/2020 | Shi ................. G01C 22/00 |

FOREIGN PATENT DOCUMENTS

DE 102015204780 A1 9/2016

* cited by examiner

*Primary Examiner* — Yi Wang
(74) *Attorney, Agent, or Firm* — Christensen O'Connor Johnson Kindness PLLC

(57) ABSTRACT

A measurement instrument identification system is described for identifying one measurement instrument, wherein the identification system includes a sensor unit, a receiving unit for receiving a signal assigned to the measurement instrument, a processing unit, and an augmented reality unit for displaying at least a representative and/or a symbol assigned to the measurement instrument. The processing unit is further configured to select the one measurement instrument out of the plurality of measurement instruments based on the received signal assigned to the at least one measurement instrument and the signal received from the sensor unit. The processing unit is further configured to control the augmented reality unit to display a representative and/or a symbol assigned to the measurement instrument. Further, a method for finding a particular measurement instrument is described.

20 Claims, 2 Drawing Sheets

MEASUREMENT INSTRUMENT IDENTIFICATION SYSTEM AS WELL AS METHOD FOR FINDING A PARTICULAR MEASUREMENT INSTRUMENT

FIELD OF THE DISCLOSURE

Embodiments of the present disclosure generally relate to a measurement instrument identification system for identifying one of a plurality of measurement instruments. Further, embodiments of the present disclosure generally relate to a method for finding a particular measurement instrument out of a plurality of measurement instruments by using a measurement instrument identification system.

BACKGROUND

Nowadays, the number of measurement instruments used in different technical applications increases significantly which results in a high number of measurement instruments located in a small area which may become defective so that they have to be identified in order to get fixed. In a factory, multiple production lines may be provided, each comprising several measurement instruments so that it is difficult to pinpoint or rather identify a certain measurement instrument that has broken down (become defective), for instance. The respective measurement instrument being of interest (as it become defective) may be part of a superior device, also called device under test, wherein the measurement instrument itself or the device assigned to the measurement instrument sends a failure signal, for instance a red flash light, which shall simplify the identification of the defective measurement instrument. However, the respective measurement instrument being defective may be located at a certain height, hidden by other measurement instruments and/or located within a high voltage area so that it is difficult for the operator to pinpoint the defective measurement instrument.

Even though the defective measurement instrument has been pinpointed, it has to be fixed manually. Thus, the user or operator has to manually access the measurement instrument or the device assigned to the respective measurement instrument.

Hence, time critical failures are difficult to fix in the given time due to the time consuming finding and the manual fixing process.

Therefore, there is a need for a fast and simple opportunity to identify a certain measurement instrument out of a plurality of measurement instruments in order to save time.

SUMMARY

Embodiments of the present disclosure provide a measurement instrument identification system for identifying one of a plurality of measurement instruments, wherein the identification system comprises:

a sensor unit for position and directional detection, a receiving unit for receiving a signal assigned to the at least one measurement instrument, a processing unit configured to process a signal received from the sensor unit and the signal from the receiving unit, and an augmented reality unit for displaying at least a representative of the measurement instrument and/or a symbol assigned to the measurement instrument (at least one of a representative of the measurement instrument and a symbol assigned to the measurement instrument), wherein the processing unit is further configured to select the one measurement instrument out of the plurality of measurement instruments based on the received signal assigned to the at least one measurement instrument and the signal received from the sensor unit and wherein the processing unit is further configured to control the augmented reality unit to display a representative of the at least one measurement instrument and/or a symbol assigned to the at least one measurement instrument (at least one of a representative of the at least one measurement instrument and a symbol assigned to the at least one measurement instrument).

Further, embodiments of the present disclosure provide a method for finding a particular measurement instrument out of a plurality of measurement instruments, for instance a defective measurement instrument, by using a measurement instrument identification system, with the following steps:

Receiving a signal from the particular measurement instrument, and

Displaying a representative and/or a symbol of the particular measurement instrument via an augmented reality unit of the identification system when the augmented reality unit is directed towards the particular measurement instrument wherein the direction of the augmented reality unit is sensed via a sensor unit of the identification system.

Accordingly, an augmented reality unit is used for simplifying the finding process of the respective measurement instrument, in particular the defective measurement instrument, as a representative and/or a symbol is displayed via the augmented reality unit so that the user or rather the operator is informed about the location of the respective measurement instrument in an intuitive manner. The (viewing) direction of the augmented reality unit is sensed and processed so that it can be determined when the augmented reality unit is directed towards the respective measurement instrument sending a signal. Thus, it is not necessary that the user or operator has to search manually for the respective measurement instrument as the measurement instrument is displayed by the augmented reality unit once the augmented reality unit is directed towards the respective measurement instrument.

The processing unit selects one measurement instrument out of the plurality of measurement instruments based on the received signal assigned to the at least one measurement instrument as well as the signal received from the sensor unit since it is verified whether the respective measurement instrument is located in the (viewing) direction. Moreover, the respective measurement instrument is only selected under certain circumstances, namely when it sends out a certain signal received and processed appropriately.

According to an aspect, the sensor unit is configured to provide information regarding the position and the direction of the augmented reality unit. This means that the sensor unit is connected to the augmented reality unit so that the position as well as the direction of the augmented reality unit is determined and used for determining the respective viewing direction via the augmented reality unit.

According to another aspect, the processing unit is configured to read out at least one parameter assigned to the at least one measurement instrument, in particular wherein the processing unit is further configured to display the at least one parameter via the augmented reality unit.

Hence, at least one parameter of the particular measurement instrument may be read out, in particular wherein the at least one parameter is displayed via the augmented reality unit.

Thus, the respective data of the measurement instrument identified via the identification system can be provided to the user or operator as the at least one parameter is read out. For an intuitive information, the at least one parameter is displayed via the augmented reality unit so that the operator is directly informed appropriately without any manual intervention.

The at least one parameter may correspond to a mode of the measurement instrument causing the signal to be sent. Hence, the at least one parameter may provide information to the operator. The parameter may already indicate a failure of the respective measurement instrument.

Generally, a monitoring of the measurement instruments can be done in a simple manner as the respective parameter(s) used for monitoring purposes are sent (in a monitoring mode), for instance in certain time intervals.

The at least one parameter read out and/or displayed may comprise a respective value, for instance a certain frequency.

Several parameters assigned to the at least one measurement instrument may be read out and/or displayed via the augmented reality unit.

Moreover, the processing unit may be configured to read out at least one failure signal assigned to the at least one measurement instrument, in particular wherein the processing unit is further configured to display the at least one failure signal via the augmented reality unit. Accordingly, an occurring failure of the identified measurement instrument is directly forwarded to the operator so that the operator is informed about the failure type. The measurement instrument itself may send the failure signal or a failure analysis unit (wirelessly) connected with the respective measurement instrument.

According to an embodiment, a control interface is provided to control the at least one measurement instrument. Thus, the measurement instrument identification system is configured to control the at least one measurement instrument identified previously via the control interface. Thus, the operator is enabled to take over control of the respective measurement instrument so that it is not required to fix an occurring problem manually since the operator can control the respective measurement instrument in a remote manner. Thus, the control interface may correspond to a wireless communication standard.

For instance, the processing unit is configured to control the measurement instrument with regard to at least one parameter and/or at least one action.

The particular measurement instrument may be controlled via the identification system, in particular wherein the particular measurement instrument is controlled with regard to at least one parameter and/or at least one action of the measurement instrument.

Thus, certain settings of the measurement instrument identified can be controlled via the identification system. Hence, the fixing of any occurring failure is simplified significantly. Moreover, an action to be done by the respective measurement instrument can be controlled remotely, for instance a rebooting of the measurement instrument.

According to an embodiment, the sensor unit comprises a position sensor and/or an orientation sensor, in particular wherein the sensor unit comprises a location sensor unit, a global navigation satellite system unit, a gyroscope unit and/or a compass unit. Thus, the position of the augmented reality unit and/or its direction can be identified in an easy manner by the respective sensor(s). Thus, it is ensured that it can be verified in which direction (and at which location) the operator is looking via the augmented reality unit. The location sensor unit may be used for indoor position sensing whereas the global navigation satellite system unit (GNSS unit) may be used for outdoor position sensing. The gyroscope unit and/or the compass unit may be used for determining the respective orientation.

The identification system may have a device with a housing encompassing the sensor unit, the receiving unit, the augmented reality unit and/or the processing unit, in particular wherein the device is a mobile end device such as a mobile phone or augmented reality glasses. The operator may wear the identification device, for instance the augmented reality glasses, so that an intuitive identification of the at least one measurement instrument is ensured. The housing of the respective device may establish the glasses frame at least in parts. Alternatively, the identification device may be a mobile end device with a camera and a display so that the environment can be recorded via the camera, which is displayed via the display. The respective information, namely the representative and/or the symbol assigned to the measurement instrument, is also displayed on the display via the augmented reality unit.

Moreover, the identification system comprises at least one measurement instrument, in particular wherein the at least one measurement instrument and the device are connected with each other. The measurement instrument may directly send any signals to the identification device so that a direct connection between the identification device and the measurement instrument is provided.

Alternatively, the measurement instruments as well as the identification system, in particular the identification device, are assigned to a certain wireless network or any other suitable communication network. The signals may be exchanged directly and/or indirectly via a hub, a router or any other communication unit being integrated in the network.

For instance, the at least one measurement instrument comprises an identification unit that is configured to send out a signal assigned to the at least one measurement instrument, wherein the signal comprises a failure signal portion and/or an identification signal portion, in particular wherein the identification signal portion comprises information regarding the type of the at least one measurement instrument and/or information regarding the position of the at least one measurement instrument.

The signal received may comprise a failure signal portion and/or an identification signal portion, in particular wherein the identification signal portion comprises information regarding the type of the at least one measurement instrument and/or information regarding the position of the at least one measurement instrument.

The respective signal is received by the measurement instrument identification system, in particular the receiving unit, so that the information contained in the signal received is forwarded to the processing unit for further processing, in particular analyzing. For instance, the information regarding the position of the at least one measurement instrument is compared to the information received from the sensor unit so that a matching of the position(s) and the orientation results in displaying the representative and/or the symbol of the respective measurement instrument via the augmented reality unit.

Moreover, the identification system may be configured to identify a defective measurement instrument out of a plurality of measurement instruments. Thus, the measurement instrument to be identified is only displayed via the augmented reality unit in case of a failure of the respective measurement instrument. For instance, this is ensured when the signal received comprises a failure signal portion indicating a failure of the measurement instrument. Thus, only measurement instruments are displayed via the augmented reality unit, which send a failure signal or at least a signal comprising a failure signal portion.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
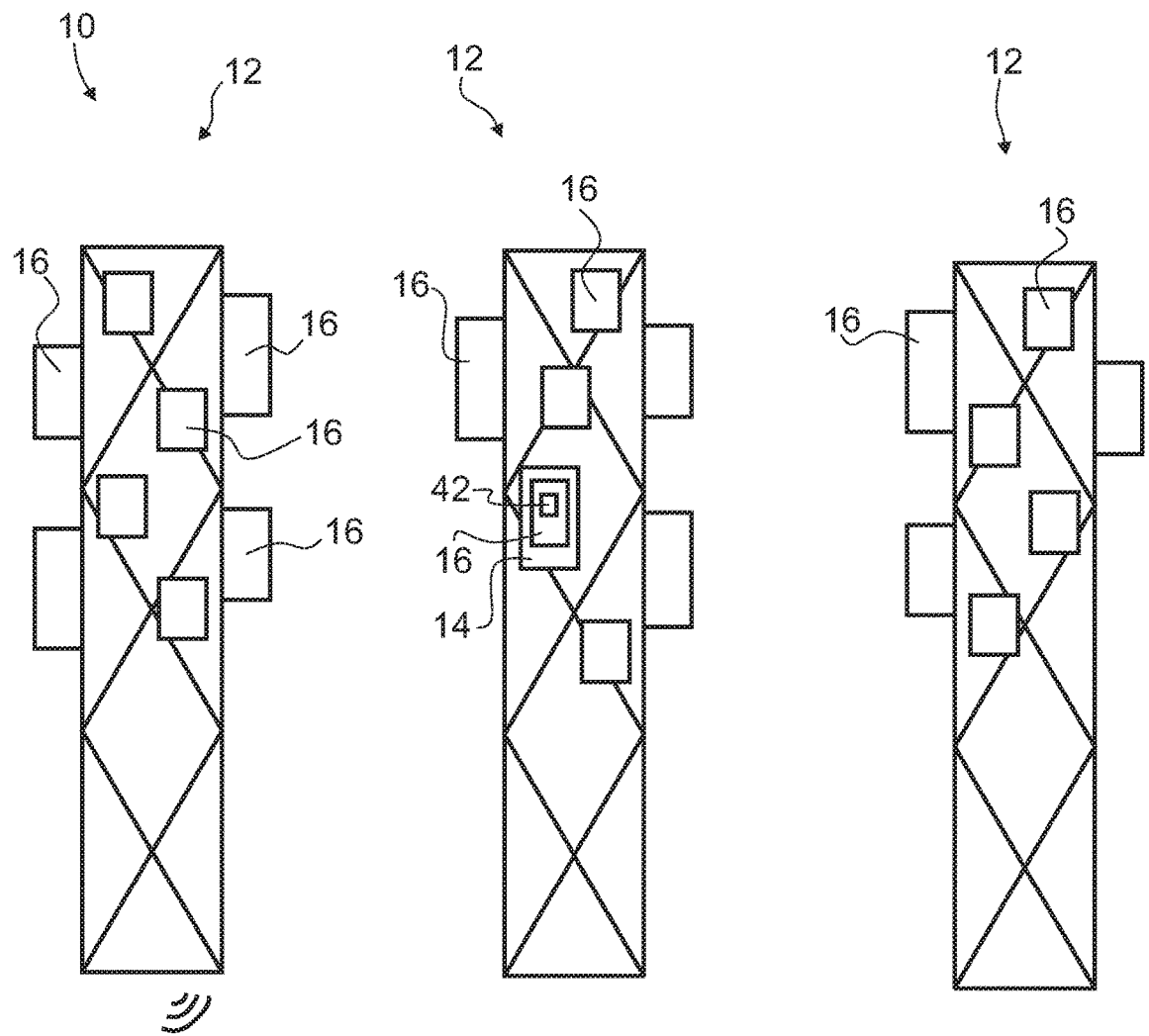
FIG. 1 schematically shows a measurement instrument identification system according to the present disclosure.
Figure 1:
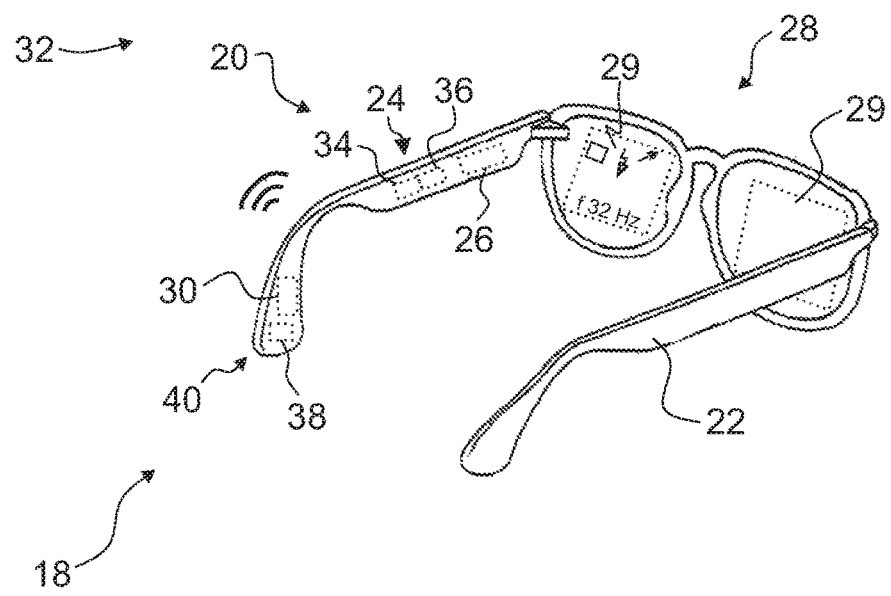

In FIG. 1, a base station site 10 is shown that comprises several base station antenna towers 12 each comprising devices 14 such as antennas and several measurement instruments 16. The measurement instruments 16 may generally be assigned to the devices 14 as shown for one particular measurement instrument 16.

Further, a measurement instrument identification system 18 is shown that is used for identifying a certain measurement instrument 16, for instance a defective one, out of the plurality of measurement instruments 16 provided by the base station site 10.

For this purpose, the identification system 18 comprises an identification device 20 with a housing 22 that encompass in the shown embodiment a sensor unit 24, a processing unit 26, an augmented reality unit 28 as well as a receiving unit 30 provided by a communication interface, for instance.

In the shown embodiment of FIG. 1, the identification device 20 is provided by augmented reality glasses that can be worn by an operator of the identification system 18. Hence, the lenses of the glasses comprise at least party a display 29 used by the augmented reality unit 28 for displaying purposes as will be described later. The glasses frame of the augmented reality glasses correspond to the housing 22 so that the respective components, namely the sensor unit 24, the processing unit 26 and the receiving unit 30 are integrated in the glasses frame.

The components of the identification device 20 are interconnected with each other, in particular via wires and lines, so that signals and information can be exchanged among each other.

The identification device 20 as well as the measurement instruments 16 are connected with each other via a wireless network 32 so that signals and/or information may be exchanged directly. Furthermore, the measurement instruments 16 as well as the identification device 20 may communicate with each other indirectly via a hub, a router or any other suitable communication unit being part of the network.

As shown in FIG. 1, the sensor unit 24 used by the identification device 20 comprises a position sensor 34 as well as an orientation sensor 36. For instance, the position sensor 34 may be established by a location sensor unit and/or a global navigation satellite system unit (GNSS unit) whereas the orientation sensor 36 may be established by a gyroscope or a compass unit.

In general, the sensor unit 24 is configured to detect the position as well as the (viewing) direction wherein the sensor unit 24 is coupled to the augmented reality unit 28 so that the position as well as the (viewing) direction of the augmented reality unit 28 is detected via the sensor unit 24, namely the augmented reality glasses.

In fact, the sensor unit 24 detects the position of the operator wearing and/or holding the identification device 20, in particular wearing the augmented reality glasses, as well as the viewing direction of the operator, in particular the viewing direction through the glasses.

Moreover, the measurement instrument identification system 10 comprises a control interface 38 that may be assigned to the identification device 20. The control interface 38 may be established by a wireless communication interface which enables the operator to control at least one of the several measurement instruments 16, in particular all of the measurement instruments 16.

The control interface 38 as well as the receiving unit 30 can be established by a common communication unit 40, in particular a bidirectional communication unit that is configured to transmit and/or to receive signals.

Thus, the operator is enabled to take over control of the respective measurement instruments 16 in a remote manner without accessing the respective measurement instrument 16 as will be described later.

In FIG. 1, one of the several measurement instruments 16 is shown in more detail. The detailed view reveals that the measurement instrument 16 comprises an identification unit 42 that is configured to send out a signal assigned to the at least one measurement instrument 16 wherein the signal comprises an identification signal portion so that the respective measurement instrument 16 can be identified appropriately.

The identification unit 42 may be configured to generate the identification signal portion comprising information regarding the location of the measurement instrument 16 and/or the device 14 assigned thereto. Thus, the measurement instrument 16 provides information about its identification as well as information regarding its position, in particular its relative position at the base station site 10.

Further, the measurement instrument 16 may be generally configured to send out a signal that comprises a signal failure portion so that the measurement instrument 16 provides information about an occurring failure.

Alternatively to the augmented reality glasses, any other augmented reality unit may be used, for instance a user end device with a camera and a display so that the environment can be recorded via the camera and further information may be displayed on the display.

Figure 2:
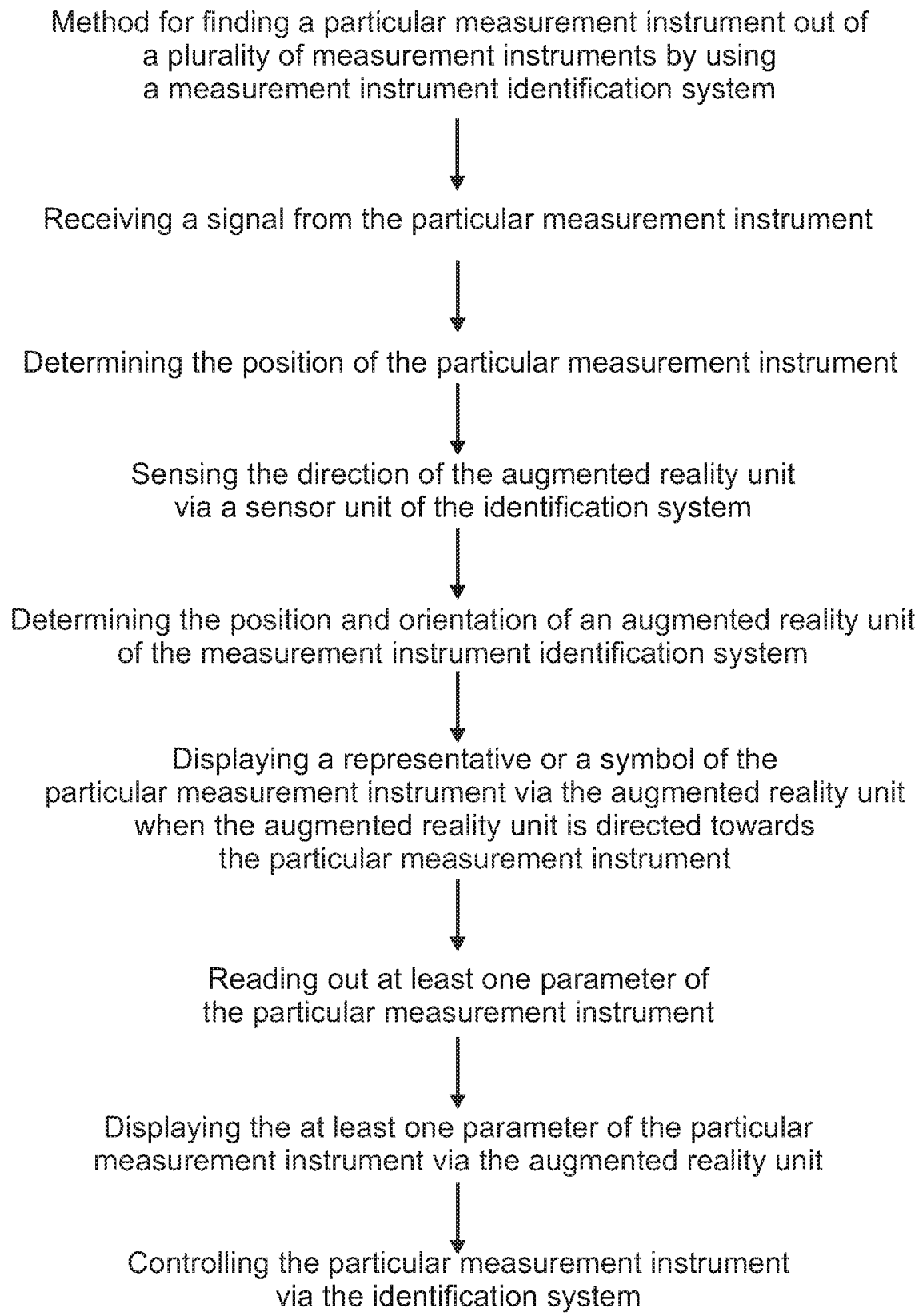
FIG. 2 schematically shows an overview representing a method for finding a particular measurement instrument according to the present disclosure.

Hereinafter, the interaction of the measurement instrument identification system 18 as well as the measurement instruments 16 will be described with reference to FIGS. 1 and 2.

The operator operating the measurement instrument identification system 18 uses the identification device 20, for instance the augmented reality glasses, for monitoring the several measurement instruments 16 provided by the base station site 10.

The sensor unit 24 detects the position as well as the viewing direction of the operator so that the processing unit 26 connected to the sender unit 24 is enabled to process the received data from the sensor unit 24 appropriately. In fact, the position as well as the orientation of the augmented reality unit 28 are sensed by the sensor unit 24 being mounted within the housing 22, namely the glasses frame.

In case of a failure, a certain operation mode or any other circumstance being of interest, for instance a certain monitoring condition, the respective measurement instrument 16 may send out a signal that is received by the receiving unit 30 of the identification device 20.

The signal sent may comprise an identification signal portion and/or a failure signal portion which may comprise information regarding the type of the at least one measurement instrument 16, information regarding the position of the measurement instrument 16 and/or a certain failure of the measurement instrument 16.

Moreover, the signal received from the measurement instrument 16 may comprise a certain parameter of the measurement instrument 16 such that the identification device 20 is enabled to read out the at least one parameter.

The receiving unit 30 that receives the signal assigned to the at least one measurement instrument 16 forwards the respective signal to the processing unit 26 that processes the signal received from the receiving unit 30 appropriately.

Hence, the processing unit 26 processes the signal received from the sensor unit 24 as well as the signal received from the receiving unit 30 so that the position and the viewing direction of the operator as well as the location of the measurement instrument 16 sending the respective signal can be determined by the processing unit 26.

Then, the position and the viewing direction of the operator, namely the ones of the augmented reality unit 28, are compared with the determined location of the measurement instrument 16.

When the processing unit 26 determines that the viewing direction as well as the location of the respective measurement instrument 16 match, it can control the augmented reality unit 28 to display at least a representative and/or a symbol of the measurement instruments 16 for informing the operator appropriately.

Hence, the operator is informed that one measurement instrument 16 is located in his viewing direction.

Thus, the processing unit 26 selects one measurement instrument 16 out of the plurality of measurement instruments 16 located at the base station site 10 based on the received signal assigned to the at least one measurement instrument 16 as well as the signal received from the sensor unit 24.

Further, the processing unit 26 controls the augmented reality unit 28 appropriately in order to display the respective information received so that the operator is informed directly in an intuitive manner.

As already mentioned, the measurement instrument 16 may send out information regarding at least one parameter so that the operator is also informed about this at least one parameter. The at least one parameter may also be displayed via the augmented reality unit 28 as indicated in FIG. 1.

Moreover, information regarding the direction of the respective measurement instrument 16 may be displayed by an arrow or any other suitable information element indicating the direction of the respective measurement instrument 16 with respect to the augmented reality unit 28.

Generally, the symbol and/or representation may indicate the type of the respective measurement instrument 16, the kind of failure, a parameter, in particular one prone to a failure, of the respective measurement instrument and/or a value of a parameter.

Should the operator verify that a failure is present that has to be overcome, the identification system 18, in particular the identification device 20, can be used to control the at least one measurement instrument 16. For this purpose, control signals may be sent via the control interface 38 enabling the operator to take over control of the respective measurement instrument 16.

For instance, the measurement instrument 16 can be controlled with regard to the at least one parameter (read out previously) and/or at least one action to be done by the measurement instrument 16 so that the failure can be overcome in a fast manner without the need of manually accessing the respective measurement instrument 16.

In general, the measurement instrument identification system 18 ensures that the operator is enabled to pinpoint the location of a certain measurement instrument 16 or rather a device under test assigned to the measurement instrument 16 by just observing the environment via the augmented reality unit 28, in particular the identification device 20.

Hence, the operator is viewing to different directions wherein the respective symbol and/or representative are/is displayed by the augmented reality unit 28 once the viewing direction matches the location of the respective measurement instrument 16 sending a certain signal so that the user gets informed directly.

Further, the measurement instrument identification system 18 is enabled to display the respective measurement instrument 16, in particular a representative and/or a symbol thereof, as well as (key) parameters without any manual intervention by the operator.

Moreover, the measurement instrument identification system 18 ensures that the operator is enabled to control the measurement instrument 16 or rather the device under test assigned thereto without the need of being physical proximate to the respective measurement instrument 16.

Thus, it is no more necessary to manually find out the respective measurement instrument 16 and to fix it manually since the measurement instrument 16 is displayed and controlled via the augmented reality unit 28.

Besides the failure fixing, the measurement instrument identification system 18 can be used for monitoring purposes so that the proper operation of the several measurement instruments 16 can be monitored easily.

Any module or unit described herein may be established by software modules so that a computer program is provided that may be used by the processing unit 26. The computer program has a program code adapted to cause the processing unit 26 to perform the steps mentioned above when the computer program is run on the processing unit 26. Alternatively, the modules may be established by hardware circuitry, or combination of software and hardware circuitry.

It will then be appreciated that one or more aspects of the methods set forth herein can be carried out in a computer system. In this regard, a program element is provided, which is configured and arranged when executed on a computer to perform a test assigned to a quite zone of a test chamber. In one embodiment, the program element may specifically be configured to perform the steps of: processing the signal received from the sensor unit and the signal from the receiving unit; selecting one measurement instrument out of a plurality of measurement instruments based on the received signal assigned to the at least one measurement instrument and the signal received from the sensor unit, and controlling the augmented reality unit to display at least one of a representative of the at least one measurement instrument and a symbol assigned to the at least one measurement instrument.

The program element may be installed in memory, such as computer readable storage medium. The computer readable storage medium may be any one of the computing devices, modules, instruments, analyzers, post processing units, etc., described elsewhere herein or another and separate computing device, modules, instruments, analyzers, post processing unit, etc., as may be desirable. The computer readable storage medium and the program element, which may comprise computer-readable program code portions embodied therein, may further be contained within a non-transitory computer program product.

As mentioned, various embodiments of the present disclosure may be implemented in various ways, including as non-transitory computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, optical disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. Other non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM) of any rate, cache memory (including various levels), flash memory, register memory, and/or the like. It will be appreciated that where embodiments are described to use a computer-readable storage medium, other types of computer-readable storage media may be substituted for or used in addition to the computer-readable storage media described above.

The computer-readable media include cooperating or interconnected computer-readable media, which exist exclusively on a processing system or distributed among multiple interconnected processing systems that may be local to, or remote from, the processing system.

As should be appreciated, various embodiments of the present disclosure may be also implemented as methods, apparatus, systems, computing devices, computing entities, and/or the like, as have been described elsewhere herein or claimed below. As such, embodiments of the present disclosure may take the form of an apparatus, system, computing device, computing entity, and/or the like executing instructions stored on a computer-readable storage medium to perform certain steps or operations. However, embodiments of the present disclosure may also take the form of an entirely hardware embodiment performing certain steps or operations.

Various embodiments are described above with reference to block diagrams and/or flowchart illustrations of apparatuses, methods, systems, and computer program products. It should be understood that each block of any of the block diagrams and/or flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks and/or carry out the methods described herein.

These computer program instructions may also be stored in a computer-readable memory, such as the computer-readable storage media described above, that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks and/or carry out the methods described herein.

It will be appreciated that the term computer or computing device can include, for example, any computing device or processing structure, including but not limited to a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof.

Accordingly, blocks of the block diagrams and/or flowchart illustrations support various combinations for performing the specified functions, combinations of operations for performing the specified functions and program instructions for performing the specified functions. Again, it should also be understood that each block of the block diagrams and flowchart illustrations, and combinations of blocks in the block diagrams and/or flowchart illustrations, could be implemented by special purpose hardware-based computer systems or circuits, etc., that perform the specified functions or operations, or combinations of special purpose hardware and computer instructions.

According to some embodiments, many individual steps of a process may or may not be carried out utilizing the computer systems described herein, and the degree of computer implementation may vary, as may be desirable and/or beneficial for one or more particular applications.

It should now be appreciated that some embodiments of the present disclosure, or portions thereof, have been described in the general context of computer code or machine-useable instructions, including computer-executable instructions such as program modules, being executed by a computing system, or other machine or machines. Some of these embodiments or others may be implemented using a variety of system configurations, including handheld devices, consumer electronics, general-purpose computers, more specialty computing devices, etc. Embodiments described herein may also be implemented in distributed computing environments, using remote-processing devices that are linked through a communications network or the Internet.

For the purposes of the present disclosure, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A measurement instrument identification system configured to identify one of a plurality of measurement instruments, the identification system comprising:
    a sensor configured to detect position and direction;
    a receiver configured to receive a signal assigned to the at least one measurement instrument;
    a processing circuit configured to process a signal received from the sensor and the signal from the receiver; and
    an augmented reality circuit configured to display at least one of a representative of the measurement instrument and a symbol assigned to the measurement instrument,
    wherein the sensor is configured to provide information regarding the position and the direction of the augmented reality circuit;
    wherein the processing circuit is further configured to select the one measurement instrument out of the plurality of measurement instruments based on the received signal assigned to the at least one measurement instrument and the signal received from the sensor and wherein the processing circuit is further configured to control the augmented reality circuit to display at least one of a representative of the at least one measurement instrument and a symbol assigned to the at least one measurement instrument; and
    wherein the processing circuit is configured to read out at least one failure signal assigned to the at least one measurement instrument.

2. The measurement instrument identification system according to claim 1, wherein the processing circuit is configured to at least one of read out and display at least one parameter assigned to the at least one measurement instrument.

3. The measurement instrument identification system according to claim 1, wherein the processing circuit is further configured to display the at least one failure signal via the augmented reality circuit.

4. The measurement instrument identification system according to claim 1, wherein a control interface is provided to control the at least one measurement instrument.

5. The measurement instrument identification system according to claim 1, wherein the processing circuit is configured to control the measurement instrument with regard to at least one of a parameter and an action.

6. The measurement instrument identification system according to claim 1, wherein the sensor comprises at least one of a position sensor or an orientation sensor.

7. The measurement instrument identification system according to claim 6, wherein the sensor comprises at least one of a location sensor unit, a global navigation satellite system unit, a gyroscope unit or a compass unit, or combinations thereof.

8. The measurement instrument identification system according to claim 1, wherein the identification system has a device with at least one of a housing encompassing the sensor, the receiver, the augmented reality circuit and the processing circuit.

9. The measurement instrument identification system according to claim 8, wherein the identification system comprises at least one measurement instrument.

10. The measurement instrument identification system according to claim 9, wherein the at least one measurement instrument and the device are connected with each other.

11. The measurement instrument identification system according to claim 9, wherein the at least one measurement instrument comprises an identification circuit that is configured to send out a signal assigned to the at least one measurement instrument, wherein the signal comprises at least one of a failure signal portion or an identification signal portion.

12. The measurement instrument identification system according to claim 11, wherein the identification signal portion comprises at least one of information regarding the type of the at least one measurement instrument and information regarding the position of the at least one measurement instrument.

13. The measurement instrument identification system according to claim 1, wherein the device includes a mobile phone or augmented reality glasses.

14. The measurement instrument identification system according to claim 1, wherein the identification system is configured to identify a defective measurement instrument out of a plurality of measurement instruments.

15. The measurement instrument identification system according to claim 1, wherein the processing circuit and the augmented reality circuit include one or more computing devices and one or more memory storing executable instructions.

16. A method for finding a particular measurement instrument out of a plurality of measurement instruments by using a measurement instrument identification system, the method comprising the steps of:
    receiving a signal from the particular measurement instrument, wherein the signal received comprises a failure signal portion; and displaying at least one of a representative or a symbol of the particular measurement instrument via an augmented reality circuit of the identification system when the augmented reality circuit is directed towards the particular measurement instrument, wherein the position and direction of the augmented reality circuit is sensed via a sensor of the identification system.

17. The method according to claim 16, wherein at least one parameter of the particular measurement instrument is at least one of read out or displayed.

18. The method according to claim 16, wherein the particular measurement instrument is controlled via the identification system.

19. The method according to claim 16, wherein the signal received comprises at least one identification signal portion.

20. A measurement instrument identification system configured to identify one of a plurality of measurement instruments, the identification system comprising:

a lens;

a sensor configured to detect position and direction of at least the lens;

a receiver configured to receive a signal assigned to the one measurement instrument, wherein the signal received comprises a failure signal portion;

one or more computing devices and memory storing program code configured to cause the one or more computing devices to:

process a signal comprising position and direction of the lens received from the sensor and the signal from the receiver assigned to the one measurement instrument; and display at least one of a representative of the one measurement instrument or a symbol assigned to the one measurement instrument when the lens is directed towards the one measurement instrument.

* * * * *